April 23, 1968     B. B. ANDERSON     3,379,370

FAT TESTING CENTRIFUGE

Filed Sept. 29, 1966     3 Sheets-Sheet 1

BAZEEL B. ANDERSON
INVENTOR.

BY *Herbert J. Brown*

ATTORNEY

April 23, 1968  B. B. ANDERSON  3,379,370
FAT TESTING CENTRIFUGE

Filed Sept. 29, 1966  3 Sheets-Sheet 2

BAZEEL B. ANDERSON
INVENTOR.

BY *Herbert J. Brown*

ATTORNEY

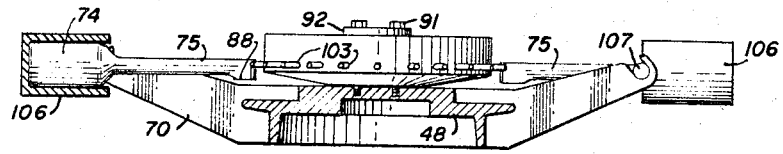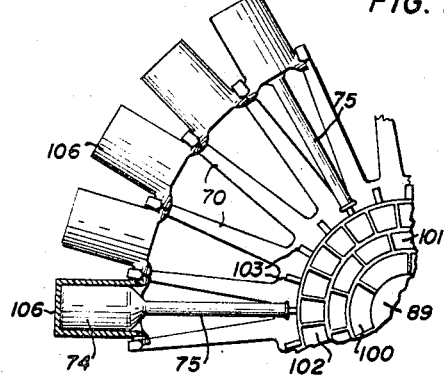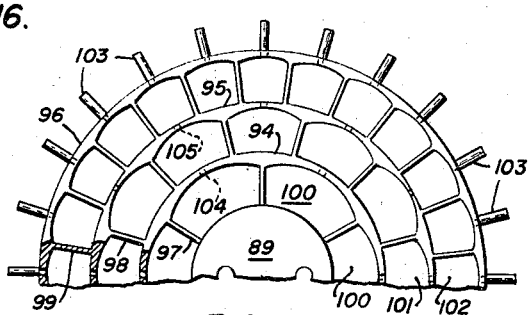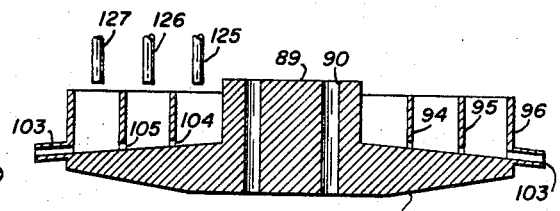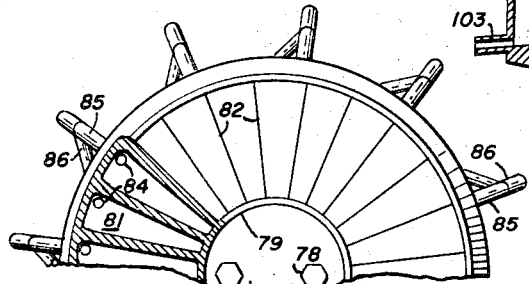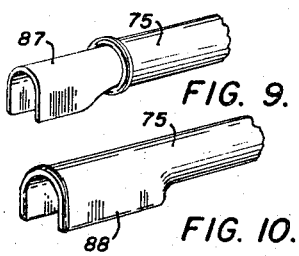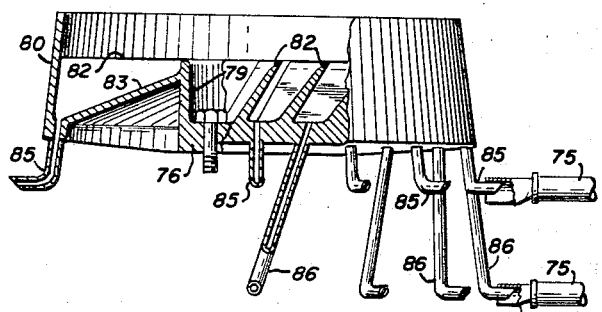

United States Patent Office 3,379,370
Patented Apr. 23, 1968

3,379,370
FAT TESTING CENTRIFUGE
Bazeel B. Anderson, P.O. Box 1957,
Fort Worth, Tex. 76101
Filed Sept. 29, 1966, Ser. No. 583,050
7 Claims. (Cl. 233—26)

ABSTRACT OF THE DISCLOSURE

A fat testing centrifuge wherein test bottles are tiltably mounted on radial arms extending from a hub, a metering wheel mounted on the hub and having at least one circular row of pockets therein for receiving a reagent while the hub and wheel are turning and means communicating the reagent in the pockets to the bottles while the latter are in their tilted positions.

This invention relates to testing for fat content in food products, either animal or vegetable, and has reference to an improved centrifuge therefor.

Generally, the separation of fat in a specimen to determine the fat content comprises the steps of placing the specimen in liquid form in a bottle, heating the specimen, adding a reagent, mixing the reagent with the specimen, applying centrifugal force to the contents of the bottle and measuring the amount of resulting separated fat. The bottle has graduations along the neck and a diluting fluid is usually added so that the specimen extends into the bottle neck during the centrifuge operation. A multiple of bottles are placed in the centrifuge at one time but each contains a different specimen, for example, milk or cream from different dairy farms. Ordinarily, the size of the bottles, the amount of specimen, the amount of diluting liquid (if any) and the amount of reagent in any one bottle are all the same for any one centrifuge. Heretofore, the diluting fluids and reagents were placed in the bottles by hand and individually mixed, which operation was time consuming and subject to error.

The primary object of the invention is to reduce the number of hand operations required when testing multiple specimens for fat content.

Another object is to assure thorough mixing of the reagent in each specimen.

Another object is provide aliquot metering means for delivering equal or substantially equal amounts of reagent to the various specimens simultaneously.

A further object is to provide better control of reaction conidtions when testing for fat when using a centrifuge for that purpose.

These and other objects of the invention will become apparent from the following description and the accompanying drawings, in which:

FIGURES 9 and 10 are broken perspective views of test bottle necks showing two different types of side opening couplers for receiving the ends of dispensing tubes.

FIGURE 11 is a broken elevational and sectional view of a metering wheel as used in one form of the invention.

FIGURE 12 is a broken plan and sectional view of the metering wheel illustrated in FIGURE 11.

FIGURE 13 is a view similar to FIGURE 12, but illustrates another form of metering wheel.

FIGURE 14 is a vertical sectional view of the metering wheel illustrated in FIGURE 13 and showing the relative position of loading spouts therefor.

FIGURE 15 is a reduced scale broken plan view of the metering wheel illustrated in FIGURES 13 and 14 and additionally showing radial arms, cup and test bottles which rotate therewith.

FIGURE 16 is a vertical sectional and partly elevational view of FIGURE 15, and

Figure 1:
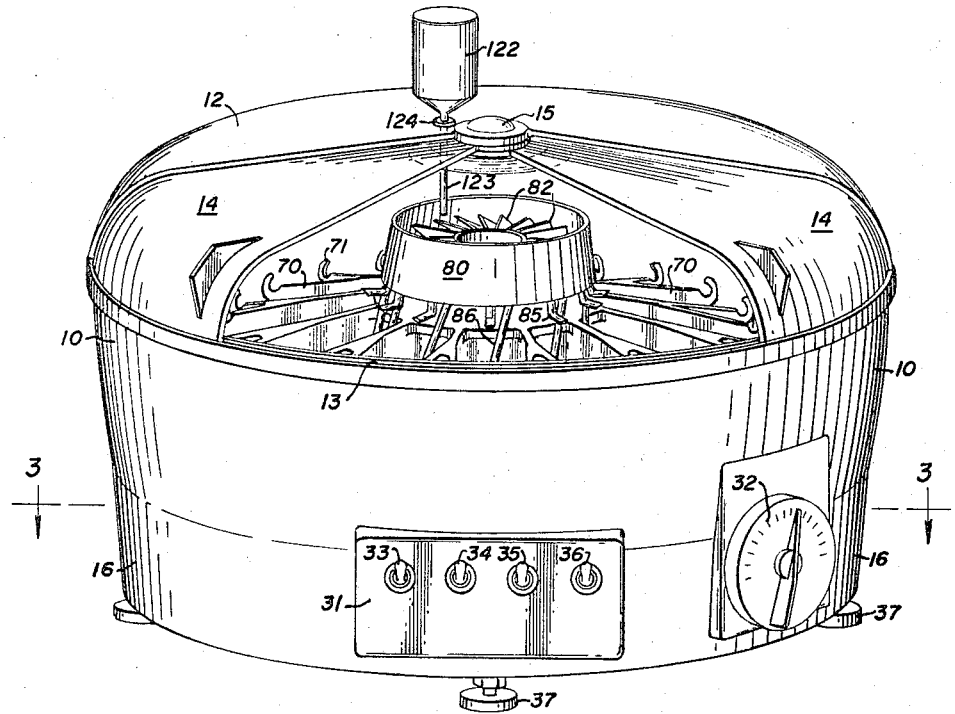
FIGURE 1 is a perspective view of a centrifuge including the features of the invention.
Figure 3:
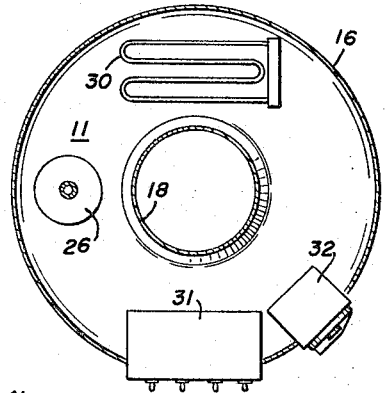
FIGURE 3 is a reduced scale sectional view taken approximately on line 3—3 of FIGURE 1.
Figure 2:
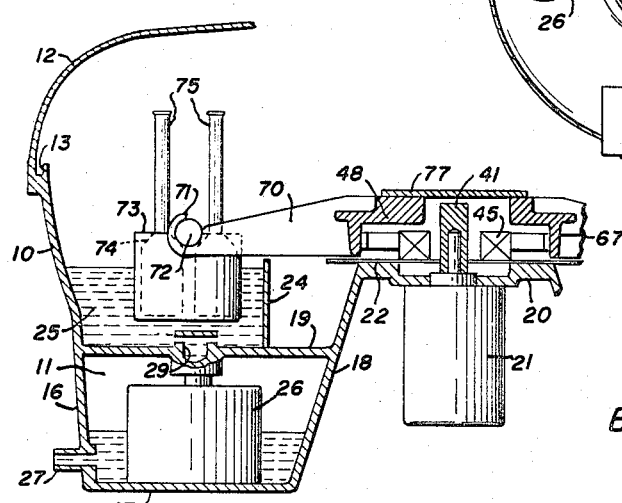
FIGURE 2 is a fragmentary vertical sectional view of the centrifuge illustrated in FIGURE 1, but is shown without the clutch mechanism and without the metering wheel.

Referring now to FIGURES 1-3, the centrifuge shown includes a bowl 10, a circular chamber 11 therebeneath and a domed half cover 12 over one-half of the bowl. The rim of the remaining one-half of the bowl 10 is grooved, at 13, to slidably receive the lower edges of two doors 14 which are shaped to be received within and positioned adjacent to the inner surface of the cover 12. A pin assembly 15 is mounted in ther adial center of the cover 12 and on which the doors 14 turn.

The chamber 11 has an outer circular wall 16 which is an extension of the bowl 10, a bottom 17, and an upwardly and inwardly sloping inner wall 18 which terminates above the bottom 19 of the bowl. A central circular horizontal support 20 is integral with the upper periphery of the inner wall 18 and supports a motor 21 therebeenath. The motor 21 is vertically disposed and the upper surface 22 of the support 20 is recessed to accommodate the heads of bolts 23 (FIGURE 4) for holding the motor in place.

Within the bowl 10, and spaced from the upwardly extending wall 18 of the chamber 11, there is a vertical circular wall 24 on the bowl bottom 19 which defines a circular reagent bath 25. As will become apparent from the description of operation to follow, liquid is transferred from the chamber 11 to the bath 25, and vice versa, by a pump 26 mounted in the chamber and in communication with the bath. As shown in the lower left portion of FIGURE 2, there is an inlet 27 for replenishing the liquid in the chamber 11. A baffle 28 mounted on a bracket, not shown, is positioned over and spaced from the discharge 29 of the pump. There is an electric heater 30 in the bottom of the chamber 11, spaced from the pump 26, for heating the liquid. Other details shown in FIGURES 1 and 3 include a switch box 31 in the front of the bowl 10 and a speed control 32 to the side thereof. The first three switches shown, 33, 34 and 35 in the front of the box 31, respectively control the heater 30 and the agitator mechanism and centrifugal action to be described. The fourth switch 36 is for operating the pump 26. The circuits referred to are not herein shown or described because the same would be obvious to one having ordinary skill in the art. Vertically adjustable feet 37 are positioned around the bottom of the centrifuge.

Figure 5:
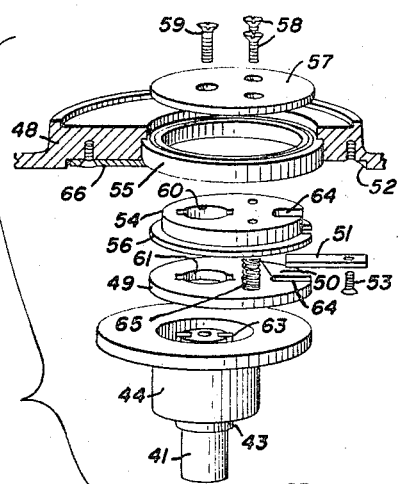
FIGURE 5 is an exploded and partly sectional view of the agitating mechanism illustrated in FIGURE 4.
Figure 4:
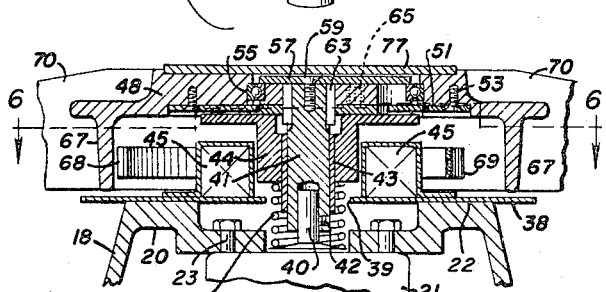
FIGURE 4 is an enlarged fragmentary vertical sectional view of the clutch and cam action agitating mechanism.

Referring now to FIGURES 4 and 5, which illustrate the cam action agitating mechanism and the centrifuge drive mechanism, there is a circular plate 38 on the motor support 20 and which plate has a central opening 39. The shaft 40 of the motor 21 extends upwardly into a shaft extension 41 which is held in place by set screw 42. Slidably mounted around the shaft extension 41 there is a sleeve bearing 43 which is pressed in an axial opening, not numbered, through a cylindrical solenoid armature 44. A solenoid coil 45 is mounted on the plate 38 around the central opening 39. The upper end of armature 44 is flanged for frictional engagement with a clutch plate 49 for turning a hub 48. The armature 44 is urged upwardly by a coil compression spring 46 between the armature and the motor 21 when the solenoid coil is de-energized and bears against the clutch plate 49. There is a shelf-like recess 50 in the form of an obtuse triangle in the upper surface and on one side of the clutch plate 49 for receiving and engaging an inwardly directed finger 51 which is secured in a recess 52 in the bottom and side of the hub 48 by a screw 53. Above the clutch plate 49 there is a circular cam 54, the circumference of which is received in an anti-friction bearing 55 in the hub 48. The clutch plate 49, cam 54 and bearing 55 are eccentrically positioned relative to the centers of the extension shaft 41 and the hub 48 which are in axial alignment with each other. There is a flange 56 around the bottom of the cam 54 for engaging the inner race of the bearing 55, and similarly there is a disc cam cover 57 in the upper portion of the hub 48 which also engages the inner race of the bearing. As best shown in FIGURE 5, two screws 58 secure the cam cover 57 to the cam 54, whereas another screw 59 secures the cover to the upper end of the shaft extension 41. Both the cam 54 and the clutch plate 49 have splined openings 60 and 61 for receiving the upper end of the shaft extension 41 and keys 63 in opposite sides thereof. The slot 64 shown in the sides of the cam 54 and the clutch plate 49 are to accommodate the finger 51 when assembling these parts. Other details shown include a light compression spring 65 between the cam 54 and clutch plate 49 for normally moving the same apart, and a plate 66 in the bottom of the hub for holding the bearing 55 in place.

Figure 6:
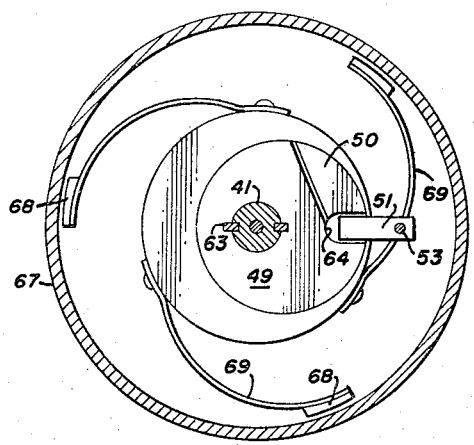
FIGURE 6 is a sectional view taken on lines 6—6 of FIGURE 4.

There is a skirt 67 around the hub 48 and within the skirt there are three brake shoes 68 mounted on arcuate leaf springs 69 which, in turn, are mounted on the outer wall of the solenoid coil 45. As shown in FIGURE 6, when the skirt 67 is concentric with the shaft extension 41, the brake shoes 68 do not touch the skirt; however, during the agitating operation to be described, the shoes alternately make contact with the skirt to prevent the hub 48 from turning.

Figures 7, 8:
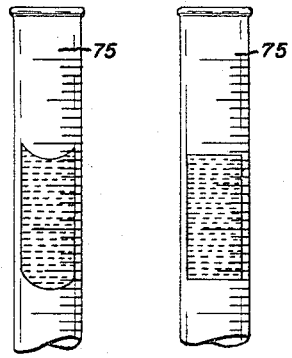
FIGURES 7 and 8 are broken elevational views of test bottle necks showing the meniscuses of the separated fat during the centrifugal action and after the centrifugal action.

Flat vertically disposed radial arms 70 extend from the hub 48 and skirt 67 to over the reaction bath 25 where the extending ends of the arms are in the form of upwardly turned hooks 71 for rotatably engaging trunnions 72 on opposite sides of test bottle receiving cups 73. The cups 73, one of which is shown in FIGURE 2, are of the type which hold two conventional test bottles 74 each, one outwardly of the other. The necks 75 of the bottles are calibrated as shown in FIGURES 7 and 8.

The metering wheel shown in FIGURES 11 and 12 has to do with adding equal amounts of liquid reagent to the test bottles 74. The wheel includes a circular base 76 which fits on a plate 77 on the top of the hub 48 and is secured in place by bolts 78. Around the circular base 76 there is a vertical wall 79, and spaced from this wall there is an outer inwardly inclined wall 80. Pockets 81 are provided between the inner and outer walls 79 and 80, and which pockets are comprised of radial vanes 82 and a common downwardly and outwardly sloped bottom 83. The metering wheel turns counterclockwise as viewed from above and accordingly the vanes 82 are sloped from their upper edges to the bottom in a direction to retain liquid therein. There is a discharge port 84 in the outer rear bottom portion of each pocket 81 to which a dispensing tube 85 or 86 is connected. The first tubes 85 are relatively short whereas the remaining tubes 86 are longer. The tubes 85 and 86 are alternately arranged with the longer tubes angularly disposed so that a discharge end, which is horizontal, is beneath a horizontal discharge end of a shorter tube. Side opening couplers 87 are mounted in the mouths of the bottle necks 75 as shown in FIGURE 9. Similarly, as shown in FIGURE 10, the couplers 88 may be integral with the bottle necks 75, but in either case the open sides are inwardly directed when the bottles 74 are erect.

The form of metering wheel illustrated in FIGURES 13–16 is for dispensing reagent liquid to a selected number of bottles 74. As before, the metering wheel is concentrically mounted on the hub 48 and has a cylindrical body 89 with vertical holes 90 therethrough for receiving bolts 91 which are secured to the hub. In FIGURE 16 a retaining plate 92 is shown beneath the heads of the bolts 91. This form of metering wheel has a circular horizontal flange 93 around the lower portion of the body 89, the upper and lower surfaces of which flange are tapered. Concentric with the body 89 and spaced from each other, there are walls 94, 95 and 96, and between the body 89 and the walls there are radially disposed partitions 97, 98 and 99, thus forming circular rows of pockets 100, 101 and 102. The number of pockets progressively increases from the inner row to the outer row, for example, and as shown in the drawing, there are six pockets 100 in the first row, twelve pockets 101 in the second row and twenty-four pockets 102 in the outer row. The partitions 97, 98 and 99 are arranged so that they connect with the walls 94, 95 and 96 at the center of every other pocket in the outer two rows of pockets 101 and 102. A lateral dispensing tube 103 extends through the outer wall 96 from the bottom of each outer pocket 102. Each pocket 100 of the inner row of pockets has a port 104 in its outer wall 94 near the bottom thereof and at the transverse center of the pocket for communication with the adjacent centrally located pocket 101. Similarly, each pocket 101 of the next row of pockets has a port 105 for communication with the outward centrally located pocket 102 of the outer row of pockets.

The cups 106 for this form of the invention carry one test bottle 74 each and, as shown in FIGURE 16, the couplers 88 on the bottle necks 75 are like those described in connection with FIGURE 10. Like the first described cups 73, the cups 106 have trunnions 107 pivotally mounted in hooks 71 on the extending ends of adjacent radial arms 70.

Figure 17:
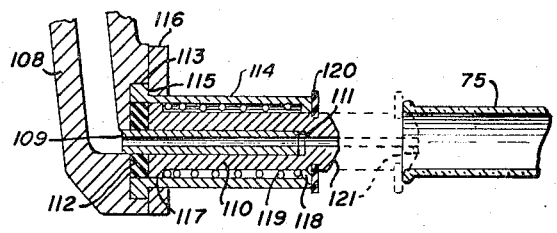
FIGURE 17 is a broken vertical sectional view of a spring retracting coupler as a modified component of the invention and showing the same engaging the mouth of a test bottle by means of dotted lines.

Referring now to FIGURE 17, which illustrates a coupler to take the place of those illustrated in FIGURES 9 and 10, the dispensing tube 108 shown is nearly perpendicular and is of cast material. There is a laterally extending guide tube 109 in the lower end of the dispensing tube 108, and slidably mounted on the guide tube there is a cylindrical coupler element 110. There is an axial opening 111 of reduced diameter in the outer end of the coupler element 110 in communication with the guide tube 109. A washer 112 around the inner end of the guide tube 109 is received in a circular recess 113 in the side of the dispensing tube 108 and the shouldered end 115 of a tubular housing 114 is also received in the recess, but around the washer. A retainer ring 116 around the housing 114 is detachably secured by screws, not shown, on the dispensing tube 108 and engages the shoulder 115 of the housing. Within the housing 114, the inner end of the coupler element 110 is outwardly shouldered at 117 and the extending end of the housing is inwardly shouldered at 118 to provide means accommodating a coiled compression spring 119, the ends of which bear against the two shoulders. In a notch, not numbered, around the coupler element 110, just outwardly of the housing 114 when the element is in its retracted position, there is a washer 120, the outside diameter of which is at least as large as the diameter of the bottle neck 75 with which it makes sealing contact. The extending end of the coupler element 110 outwardly of the washer 120 is tapered as indicated at 121.

The operation of the first described form of the invention is as follows:

First, the liquid in the chamber 11 is heated by the heater 30. The liquid is usually water and is heated to approximately 212° F. While the liquid is heating the samples are placed in the bottles in measured amounts and the bottles are then placed in the cups 73. The hub 48, arms 70 and the metering wheel, illustrated in FIGURES 11 and 12, are spun counterclockwise as viewed from above, thus causing the cups 73 to assume a horizontal position and to cause the bottle necks 75, by means of couplers 87 or 88, to fit over the projecting ends of the dispensing tubes 85 and 86. While spinning, the reagent in a measured amount, is placed in a reagent container 122 atop the cover 12, and which container includes a depending spout 123 supported in the cover by a grommet 124. It is to be noted that the depending end of the spout 123 is over the pockets 81 in the metering wheel. Thus, the reagent in equal amounts is delivered to the bottles 74 through the dispensing tubes 85 and 86, the couplers 87 or 88 and the bottle necks 75. The spinning is carried out by the motor 21, shaft extension 41, the splined clutch plate 49, the spring 46 urging the armature 44 and the clutch plate upwardly, and engagement of the finger 51 on the hub 48 with the recess 50 in the clutch plate.

After dispensing the reagent the spinning is stopped and the bottles assume upright positions. The liquid is then pumped from the chamber 11 to the reagent bath 25. The pump 26 remains operating to keep the liquid in the bath 25 while the bottles 74 and contents are heating. Next, the solenoid coil 45 is energized causing the armature 44 to move downwardly, and the clutch plate 49, aided by the small spring 65, moves downwardly and disengage the finger 51. The motor 21 is then turned on, and by reason of the action of the cam 54, which is splined on the shaft extension 41, the hub is caused to oscillate and shake the bottles 74 carried by the cups 73. This agitating operation takes the place of individually stirring the contents of each bottle.

The solenoid coil 45 is de-energized after the reagents and samples are thoroughly mixed and reacted, and the pump 26 is then stopped, allowing the liquid to return to the chamber 11. The large spring 46 moves the armature 44 upwardly and causes the clutch plate 49 to engage the finger 51. If the finger 51 is not initially received in the clutch plate recess 50, rotation of plate 49 by the motor 21 will cause the finger to be received in the recess 52.

The hub 48, metering wheel and bottles are again spun and a measured amount of diluting fluid is added through the reagent container 122 so as to bring the mixture into the graduated portions of the bottle necks 75. Continued spinning causes the fat to separate from the reaction mixture, which separated fat defines menicuses opposite the graduations. The spinning operation is then stopped, the bottles 74 are lifted from the centrifuge and the fat content is quantitatively determined.

The metering wheel illustrated in FIGURES 13–16 is spun and bottles are agitated as in the foregoing. However, and as previously stated, this form of the invention is for employing a selected even number of test bottles. There are three reagent containers, such as 122, each having a separate spout 125, 126 and 127 positioned over the respective rows of pockets 100, 101 and 102. Thus, reagent and diluting liquid from the first row of pockets 100 go to every fourth dispensing tube 103, reagent and diluting liquid from the second row of pockets 101 go to every other dispensing tube, and when the reagent and liquid are supplied to the outer row of pockets 102, then every dispensing tube is involved.

The couplers as illustrated in FIGURE 17 depends on the spinning action of the centrifuge to extend, that is, centrifugal force overcomes the action of the springs 119 for connecting the elements 110 with the mouths of the bottle necks 75 which, as explained in the foregoing, are horizontal at this time. When the spinning operation stops the springs 119 retract the coupler elements 110.

The invention is not limited to the exemplary constructions herein shown and described, but may be made in various ways within the scope of the appended claims.

What is claimed is:

1. In a centrifuge having a bowl, a hub therein, said hub being mounted to turn about a vertical axis, radial arms extending from said hub, means rotating said hub and arms, cups pivotally mounted near their upper ends on the extending ends of said arms and test bottles in said cups, the necks of which bottles project above said cups, in combination therewith: a metering wheel concentrically mounted on said hub, said metering wheel being comprised of at least one row of open pockets therearound, a reagent container and depending dispensing spout above said row of pockets, dispensing tubes in communication with said pockets and radially extending from said metering wheel, the extending ends of said dispensing tubes being located to align with the necks of said bottle when the latter are tilted by reason of the spinning action of said hub and said arms.

2. In a centrifuge as defined in claim 1, and in combination therewith: means agitating said bottles at selected times when said hub and said arms are not turning, the last said means including a clutch mechanism in said means rotating said hub and said arms and a driven circular cam eccentrically mounted for rotation in said hub.

3. In a centrifuge as defined in claim 2, the construction wherein said clutch mechanism includes a vertically movable armature, a spring normally urging said armature upwardly, means connecting said armature with said hub when said armature is in its raised position, and a solenoid coil around said armature, the flux of said coil being such as to move said armature downwardly when said coil is energized and thereby disengage said means connecting said armature with said hub.

4. In a centrifuge as defined in claim 1, the construction wherein said metering wheel is comprised of inner and outer spaced concentric circular walls, a bottom connecting said walls, and equally spaced radially disposed vanes between said inner and outer walls defining said row of pockets.

5. In a centrifuge as defined in claim 1, the construction wherein said metering wheel is comprised of multiple concentric rows of said pockets, communication means between alternate pockets of said rows of pockets, and reagent dispensing means selectively dispensing reagent to any one row of said pockets.

6. In a centrifuge as defined in claim 1, and including a coupler between each said dispensing tube and the mouth of said bottle neck aligned therewith, each said coupler being comprised of a laterally extending guide tube in the outer end of a said dispensing tube, a coupler element slidably mounted on said guide tube and having an axial opening therethrough, and spring means normally retracting said coupler element.

7. In a centrifuge having a bowl, a hub therein, said hub being mounted to turn about a vertical axis, radial arms extending from said hub, means rotating said hub and said arms, cups pivotally mounted near their upper ends on the extending ends of said arms and test bottles in said cups, in combination therewith: means agitating said bottles at selected times when said hub and said arms are not turning, the last said means including a clutch mechanism in said means rotating said hub and said arms and a driven circular cam eccentrically mounted for rotation in said hub.

References Cited
UNITED STATES PATENTS

| | | | |
|---|---|---|---|
| 998,529 | 7/1911 | Ketcham | 233—17 |
| 1,713,579 | 5/1929 | Wrightman | 233—26 |
| 1,895,104 | 1/1933 | Quiroz | 233—20 |
| 3,026,719 | 3/1962 | Kopczynski | 233—23 |

HENRY T. KLINKSIEK, *Primary Examiner.*